US007743698B2

(12) United States Patent
Muir et al.

(10) Patent No.: US 7,743,698 B2
(45) **Date of Patent: *Jun. 29, 2010**

(54) FOUNTAIN THAT FLOWS WITH FLUIDIC MATERIAL

(75) Inventors: Richard B. Muir, San Diego, CA (US); William F. Polley, Marco Island, FL (US); Devan B. Muir, San Diego, CA (US); Wu C. Liang, Taoyuan (TW)

(73) Assignee: Sephra L.P., San Diego, CA (US)

( * ) Notice: Subject to any disclaimer, the term of this patent is extended or adjusted under 35 U.S.C. 154(b) by 823 days.

This patent is subject to a terminal disclaimer.

(21) Appl. No.: 11/418,825

(22) Filed: May 5, 2006

(65) Prior Publication Data

US 2006/0283972 A1 Dec. 21, 2006

Related U.S. Application Data

(63) Continuation-in-part of application No. 11/253,399, filed on Oct. 19, 2005, now Pat. No. 7,182,269, which is a continuation of application No. 10/698,283, filed on Oct. 31, 2003, now Pat. No. 7,021,556.

(51) Int. Cl.

| | |
|---|---|
| ***A23C 3/02*** | (2006.01) |
| ***A23C 15/04*** | (2006.01) |
| *A01J 11/00* | (2006.01) |
| *A23C 1/00* | (2006.01) |

(52) U.S. Cl. ............................ 99/483; 99/452; 239/16; 239/20; 239/28; 239/722

(58) Field of Classification Search ............ 239/16–29, 239/722, 29.3, 29.5, 30–32; 99/483, 452; 222/411–413

See application file for complete search history.

(56) References Cited

U.S. PATENT DOCUMENTS 692,449 A 2/1902 Joseph (Continued)

FOREIGN PATENT DOCUMENTS

EP 0 410 381 A 1/1991

(Continued)

OTHER PUBLICATIONS

Documents received from Buffett Enhancements, P.O. Box 1000, Point ar, AL 36564.

(Continued)

*Primary Examiner*—Kevin P Shaver
*Assistant Examiner*—James S Hogan
(74) *Attorney, Agent, or Firm*—Knobbe Martens Olson & Bear, LLP

(57) ABSTRACT

A fountain for heating and/or cooling a beverage comprises one or more heating and/or cooling elements that are configured to adjust a temperature of a beverage that circulates through the fountain. In one embodiment, the beverage fountain includes one or more heating elements located proximate to a basin, a cylinder, and/or a top reservoir of the fountain. In another embodiment, the beverage fountain includes one or more cooling elements located proximate to a basin, a cylinder, and/or a reservoir of the fountain. Alternatively, the beverage fountain may include both heating and cooling elements located proximate to a basin, a cylinder, a reservoir, and/or other locations of the fountain, wherein a selection device, such as an electrical switch or control module, may be adjusted by a user in order to select heating or cooling of the beverage.

23 Claims, 11 Drawing Sheets

U.S. PATENT DOCUMENTS

| | | | | |
|---|---|---|---|---|
| 1,224,324 | A | 5/1917 | Roberts | |
| 1,283,858 | A | 11/1918 | Milliken | |
| 1,322,803 | A | 11/1919 | McFadden | |
| 1,332,509 | A | 3/1920 | Martin | |
| 1,344,700 | A | 6/1920 | Loomis | |
| 1,345,043 | A | 6/1920 | Wainwright | |
| 1,692,234 | A | 11/1928 | Voorhees | |
| 1,804,519 | A * | 5/1931 | Smith et. al. | 40/538 |
| 1,928,799 | A | 10/1933 | Stevens | |
| 1,962,840 | A | 6/1934 | Rives | |
| 2,879,944 | A | 3/1959 | Musgrave | |
| 3,022,010 | A | 2/1962 | Barnett | |
| 3,032,272 | A | 5/1962 | Nesky | |
| 3,071,326 | A | 1/1963 | Benak | |
| 3,286,927 | A | 11/1966 | Zysk | |
| 3,451,622 | A | 6/1969 | Forney | |
| 3,490,694 | A | 1/1970 | Ashby | |
| 3,691,787 | A * | 9/1972 | Kaufmann | 62/400 |
| 3,713,583 | A | 1/1973 | Gruber | |
| 3,713,589 | A | 1/1973 | McNair et al. | |
| 3,749,311 | A | 7/1973 | Hruby, Jr. | |
| 3,841,023 | A * | 10/1974 | Carlyon, Jr. | 47/82 |
| 3,921,902 | A | 11/1975 | Erickson et al. | |
| 4,003,401 | A | 1/1977 | Haring | |
| 4,006,559 | A | 2/1977 | Carlyon, Jr. | |
| 4,036,367 | A | 7/1977 | Stambaugh et al. | |
| 4,099,627 | A | 7/1978 | Strada | |
| 4,574,593 | A | 3/1986 | Nelson | |
| 4,630,771 | A * | 12/1986 | Hall | 237/17 |
| 4,678,089 | A | 7/1987 | Lang | |
| 5,326,032 | A | 7/1994 | Quillin | |
| 5,390,803 | A | 2/1995 | McAllister | |
| 5,423,435 | A | 6/1995 | Pollard et al. | |
| 5,890,619 | A | 4/1999 | Belanger | |
| 6,123,206 | A | 9/2000 | Zaremba | |
| 6,848,628 | B2 | 2/2001 | Walker | |
| 6,305,570 | B1 | 10/2001 | Atkin et al. | |
| 7,021,556 | B2 * | 4/2006 | Muir et al. | 239/16 |
| D523,278 | S | 6/2006 | Tse | |
| D528,844 | S | 9/2006 | Bond | |
| 7,118,045 | B2 * | 10/2006 | Muir et al. | 239/16 |
| 7,182,269 | B2 * | 2/2007 | Muir et al. | 239/16 |
| 7,367,263 | B2 * | 5/2008 | Jaffe | 99/483 |
| 7,383,764 | B2 * | 6/2008 | Muir et al. | 239/17 |
| 2003/0218015 | A1 | 11/2003 | Randolph et al. | |
| 2004/0069860 | A1 | 4/2004 | Nary | |
| 2005/0092853 | A1 | 5/2005 | Muir et al. | |
| 2006/0081720 | A1 | 4/2006 | Esnault | |
| 2006/0118595 | A1 | 6/2006 | Muir et al. | |
| 2006/0144255 | A1 | 7/2006 | Muir et al. | |
| 2006/0283972 | A1 | 12/2006 | Muir et al. | |
| 2006/0283975 | A1 | 12/2006 | Muir et al. | |
| 2007/0007273 | A1 | 1/2007 | Esnault | |
| 2008/0111002 | A1 | 5/2008 | Muir et al. | |

FOREIGN PATENT DOCUMENTS

| | | | |
|---|---|---|---|
| FR | 929 856 | A | 1/1948 |
| FR | 2 768 423 | A | 3/1999 |
| GB | 945 906 | A | 1/1964 |
| GB | 2 290 353 | A | 12/1995 |
| GB | 2 346 658 | A | 8/2000 |
| JP | 3 280 281 | | 12/1991 |

OTHER PUBLICATIONS

Documents received from Protections Equinox, 4480, Cote-de-Liesse, suite 224, Montreal, Canada H4N 2R1.

User Guide: Giles and Posner Cascade Table Fountain, as downloaded from www.chocolatefondue.co.uk, all.

Owners Guide: Rival Chocolate Fountain, copyright 2005, as downloaded from www.rivalproducts.com, all.

International Search Report for PCT/US2004/034545.

Examination Report under Section 18(3) for UK Patent Application No. 0605098.3; National Phase of PCT/US2004/034545.

Canadian Intellectual Property Office Examination report for Application 2,540,029, Sep. 6, 2006.

Examination Report under Section 18(3) for UK Patent Application No. 0605098.3; National Phase of PCT/US2004/034545.

The Chocolate Fondue Company, "The Chocolate Fondue Fountain," Model Nos. CF 1500 and CF 2000 Combination Fountain design elements, (not dated), received from Giles and Posner of Watford, UK in Dec. 2007.

The Chocolate Fondue Company, "Frequently asked questions," (not dated), received from Giles and Posner of Watford, UK in Dec. 2007.

Janatha Machines, Chocolate Fondue, Model No. CF 2000 basin drawing (Part No. 20BN01, Drawing No. JM2OBN01), received from Giles and Posner of Watford UK in Dec. 2007.

The Chocolate Fondue Company, "Fountain Sales," [online] retrieved from the internet at: http://web.archive.org/web/20040528103738/www.chocolatefonduecompany.co.uk/sales.php.

Extended Search Report and Written Opinion for European Patent Application No. 08152101.5, filed Oct. 20, 2004.

Third Party Submission for European Patent Application No. 08152101.5, filed Oct. 20, 2004.

The American Chocolate Fountain product brochure, Buffet Enhancements International, Jan. 1, 2005, all.

Buffet Enhancements International Product Catalog No. 105, Jan. 1, 2005, pp. 1-4.

Owners Guide: Rival Chocolate Fountain, copyright 2005, as downloaded from www.rivalproducts.com, all.

International Search Report for PCT/US2004/034545, Mar. 11, 2005.

Examination Report under Section 18(3) for UK Patent Application No. 0605098.3; National Phase of PCT/US2004/034545 Oct. 30, 2006.

Examination Report under Section 18(3) for UK Patent Application No. 0605098.3; National Phase of PCT/US2004/03454, Oct. 30, 2006.

The Chocolate Fondue Company, "The Chocolate Fondue Fountain," Model Nos. CF 1500 and CF2000 Combination Fountain design elements, received from Giles and Posner of Watford, UK in Dec. 2007.

The Chocolate Fondue Company, "Frequently asked questions," (not dated), received from Giles and Posner of Watford, UK in Dec. 2007.

Janatha Machines, Chocolate Fondue, Model No. CF 2000 basin drawing (Part No. 20BN01, Drawing No. JM2OBN01), received from Giles and Posner of Watford UK in Dec. 2007.

Extended Search Report and Written Opinion for European Patent Application No. 08152101.5, filed Oct. 20, 2004.

Third Party Submission for European Patent Application No. 08152101.5, filed Oct. 20, 2004.

Non-Final Office Action for U.S. Appl. No. 10/698,283, filed Oct. 31, 2003.

The New Generation of Chocolate Fountains; Chocolate History printout of history downloaded from http://www.thechcolatefountain.com/chocolate_fountain_history.htm (Jul. 31, 2008).

Design & Realisation inc.; DR Past History from http://www.dr.ca/DR/e_dr.html (Jul. 31, 2008).

* cited by examiner

FOUNTAIN THAT FLOWS WITH FLUIDIC MATERIAL

RELATED APPLICATIONS

This application is a continuation-in-part of U.S. patent application Ser. No. 11/253,399 entitled "FOUNTAIN THAT FLOWS WITH FLUIDIC MATERIAL," filed on Oct. 19, 2005, now U.S. Pat. No. 7,182,269, which is a continuation of U.S. application Ser. No. 10/698,283, filed Oct. 31, 2003, now U.S. Pat. No. 7,021,556, issued Apr. 4, 2006, each of which are hereby incorporated by reference in their entireties for all purposes.

BACKGROUND OF THE INVENTION

1. Field of the Invention

The invention relates generally to a food dispensing apparatus, and more particularly to a fountain that flows with a fluidic material, such as a beverage.

2. Description of the Related Art

Fondue machines typically include a bowl shaped container for holding and heating chocolate. The container is heated by a heating element to melt the chocolate. Fruit, or other food items, may then be dipped into the container of the fondue machine.

In recent years, fondue machines have taken on alternate configurations. For example, Design & Réalisation Inc. in Montreal, Canada markets a chocolate fountain that moves melted chocolate so that it flows over a number of tiers like a fountain. FIG. 1 is a diagram illustrating a prior art chocolate fountain 100, such as the fountain marketed by Design & Réalisation Inc. As shown in FIG. 1, the chocolate fountain 100 includes a container 110 configured to hold and melt chocolate. A hollow barrel 120 is mounted in the center of the container 110 and provides a pathway for melted chocolate to be moved upward, through its hollow center, to the top of the fountain. An auger including a spiral flight extending around the length of the auger is mounted within the hollow barrel 120. The auger is rotated in order to lift the melted chocolate upward in the hollow barrel 120. On the top of the barrel 120 is a crown 140 that fills with chocolate that flows out of the barrel 120. When the crown 140 is full of melted chocolate, the chocolate begins to fall over the edges of the crown 140. Attached to the barrel 120 are tiers 130 which vary in size. As the chocolate flows downwardly from the crown 140, the chocolate flows over each of the tiers 130, thus forming a multi-level chocolate waterfall. The chocolate fountain 100 also includes a heating element that is placed below the container 110.

Fountains that circulate beverages for drinking, rather than melted food items such as chocolate or cheese, are also currently available. In general, these fountains use a pump to move the beverage through the fountain so that the beverage flows out of an upper structure of the fountain in order to create a stream of beverage that may be used to fill beverage containers. However, existing beverage fountains lack any means for adjusting a temperature of the beverage contained in the fountain. Accordingly, the temperature of a hot beverage, such as tea or coffee, that is circulated in an existing beverage fountain will slowly change towards the temperature of the ambient air. Accordingly, hot beverages only remain at suitable temperatures for very limited time periods and, thus, hot beverages are rarely used in existing beverage fountains. Similarly, existing beverage fountains lack any means for cooling the beverage contained in the fountain. Thus, users of currently available fountains must mix a cold substance, such as ice, into the beverage, thereby diluting the beverage and only providing cooling for a limited time period. Accordingly, the temperature of cold beverages, such as juice or soda, that is circulated in an existing beverage fountain will slowly increase towards the temperature of the ambient air. A fountain that adjusts and maintains a desired temperature of a circulating beverage is desired. More particularly, a beverage fountain that heats and/or cools a beverage is desired.

SUMMARY OF THE INVENTION

In one embodiment, a beverage fountain comprises a basin configured to contain a beverage, a source of fluid movement located proximate to the basin, a longitudinal cylinder extending substantially perpendicular from a location proximate to a bottom surface of the basin and configured to contain the beverage, wherein the source of movement pushes portions of the beverage contained in the basin upward in the cylinder, a reservoir positioned proximate a top end of the cylinder, the reservoir comprising one or more apertures through which the beverage passes in order to return to the basin, wherein the beverage circulates from the basin, through the longitudinal cylinder, through the one or more apertures in the reservoir, and returns to the basin, and one or more heating elements configured to heat the beverage.

In another embodiment, a fountain for circulating a fluidic material, the fountain comprises a basin configured to contain the fluidic material, a source of fluid movement located proximate to the basin configured to exert a force against the fluidic material, a cylinder hand an end located proximate to the basin and extending substantially perpendicular therefrom, the cylinder configured to contain the fluidic material as the fluidic material is forced through the cylinder due to the force exerted by the source of fluid movement, and one or more temperature adjusting devices coupled to at least one of the basin and the cylinder, the temperature adjusting devices being configured to adjust a temperature of the fluidic material.

In another embodiment, a fountain for circulating a fluidic material, the fountain comprises a basin for containing the fluidic material, a source of fluid movement located proximate to the basin and configured to exert a force against the fluidic material, a cylinder having an end located proximate to the basin and extending substantially perpendicular therefrom, the cylinder configured to contain the fluidic material as the fluidic material is forced through the cylinder due to the force exerted by the source of fluid movement, and means for adjusting a temperature of the fluidic material.

In another embodiment, a method of operating a beverage fountain, the method comprises providing a basin for containing the beverage, positioning a source of fluid movement proximate to the basin, the source of fluid movement being configured to exert a force against the beverage, coupling a cylinder to the basin so that an end of the cylinder is located proximate to the basin, the cylinder extending substantially perpendicular from a bottom surface of the basin, wherein the cylinder is configured to contain the beverage as the beverage is forced upward through the cylinder due to the force exerted by the source of fluid movement, and adjusting a temperature of the beverage as the beverage is forced upward through the cylinder.

DETAILED DESCRIPTION OF PREFERRED EMBODIMENTS

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
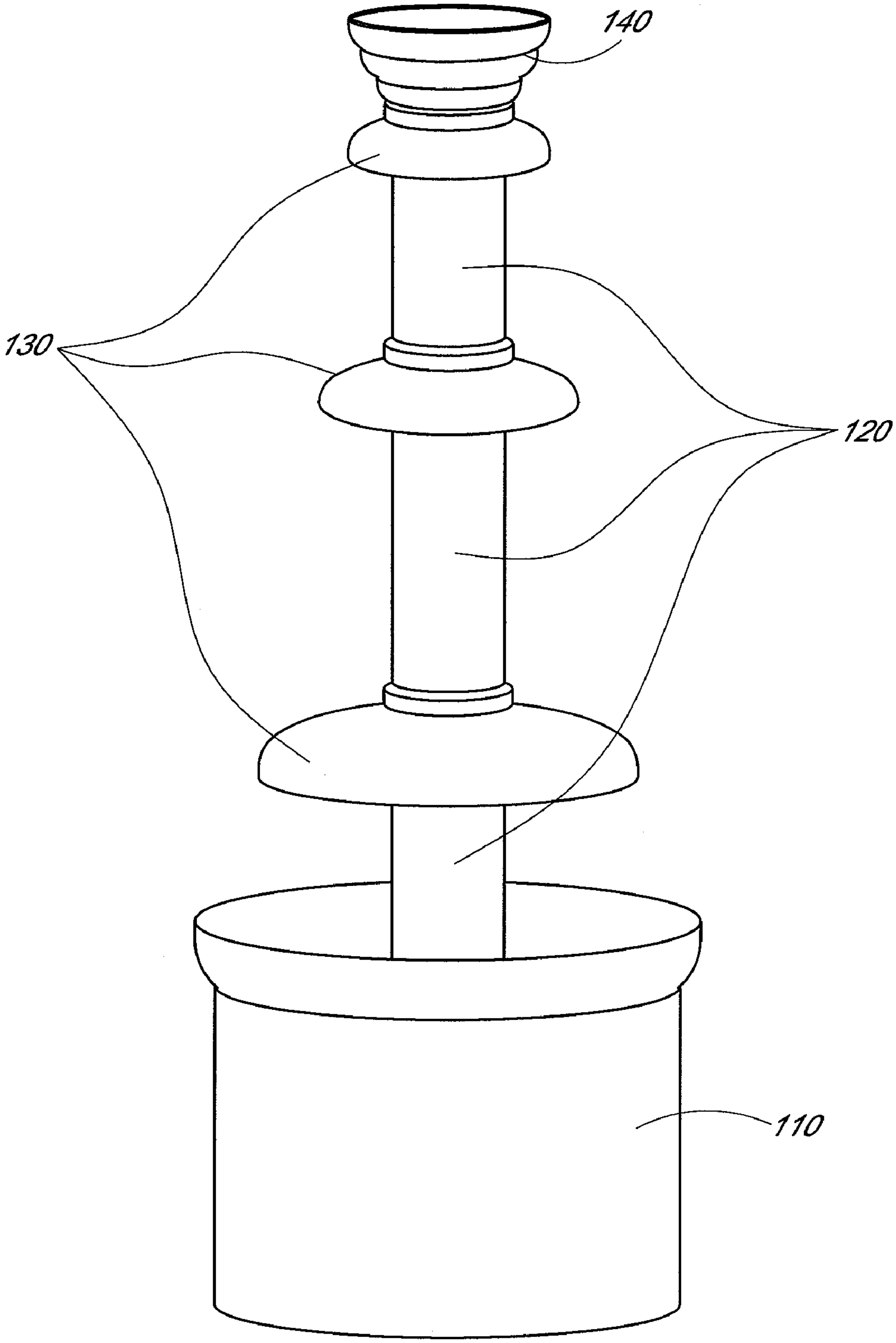
FIG. 1 ( PRIOR ART )
FIG. 1 is a side elevation view of a prior art chocolate fountain.
Figure 2:
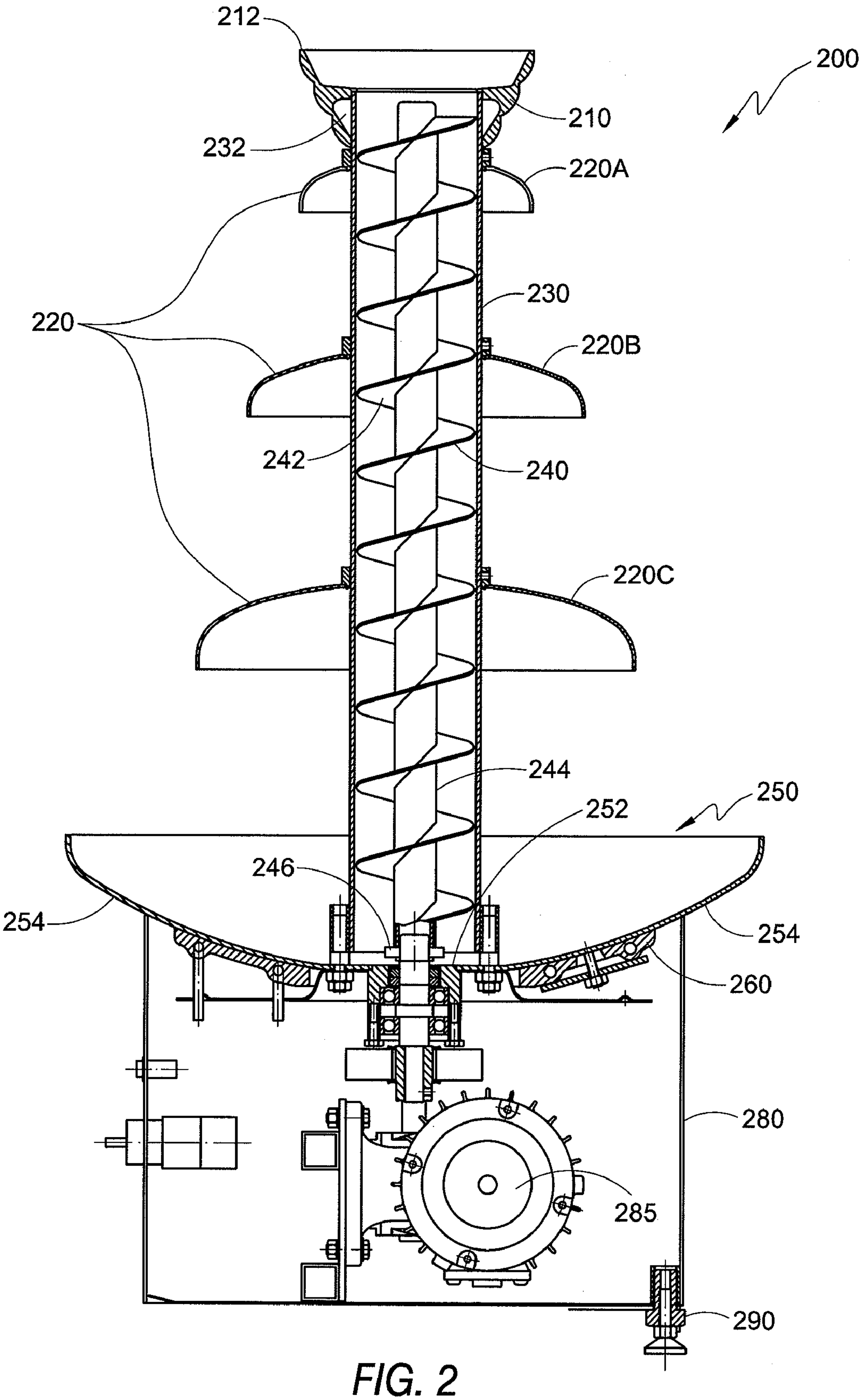
FIG. 2 is a cross-sectional side view of a chocolate fountain having features that reduce cleaning time and improve performance

FIG. 2 is a cross-sectional side view of an improved fountain 200 having features that address the disadvantages discussed above with respect to the prior art. The improved fountain 200 advantageously has reduced cleaning requirements, improved performance, and simpler set-up. In one embodiment, the fountain 200 flows with melted chocolate and is therefore referred to as a fountain 200. However, while reference is made herein to the use of chocolate in the fountain 200, the systems and methods described herein are not limited to the use of chocolate. Accordingly, references made herein to a chocolate fountain do not limit the fountain to use with chocolate, but should be interpreted to cover fountains that circulate any other fluidic material. For example, other confectionery items, such as caramel, toffee, taffy, or marshmallows; dairy products, such as cheese; or flavorings, such as mint or fruit, may be used in the fountain 200. Additionally, different varieties of chocolate, such as white chocolate, dark chocolate, or milk chocolate, may be used in the fountain 200. Furthermore, any combination of food items, such as a combination of chocolate and caramel, for example, may be used in the fountain 200. Beverages, such as coffee, tea, juice, or milk, may also be circulated in the fountain 200.

As shown in FIG. 2, the fountain 200 comprises a housing 280, upon which a basin 250 is mounted. The housing 280 houses a motor 285 and heating elements 260. The motor 285 may be any type of motor suitable to provide a rotary force. As described in further detail below, the heating element 260 is encased in an aluminum enclosure in order to more uniformly distribute the heat throughout the basin 250. Accordingly, the chocolate is uniformly heated and melted in the basin 250 due to the uniform heating of the basin 250 by the heating element 260. An auger 240 having a spiral flight 242 surrounding a central shaft 244 of the auger 240 is coupled to the bottom surface 252 of the basin 250. The motor 285 engages the auger 240 and applies a rotational force causing the auger 240 to rotate and thereby to lift melted chocolate, for example, upward inside the cylinder 230, the chocolate traveling upwardly upon the top surface of the spiral flight 242. A crown 210 is mounted on a top 232 of the cylinder 230 and provides an exit location for the melted chocolate that has been lifted through the cylinder 230, wherein the melted chocolate flows over a top circumference 212 of the crown 210. In the embodiment of FIG. 2, an adjustment nut 290 is connected to the housing 280 and allows adjustment of the height of the foot so that the fountain 200 may be leveled.

In the embodiment of FIG. 2, the fountain 200 includes three tiers 220 that are each attached to the cylinder 230. In other embodiments, any number of tiers 220, such as 1, 2, 4, 5, or 6, for example, may be attached to the cylinder 230. A top surface of each of the tiers 220 comes in contact with the melted chocolate that flows off the top circumference 212 of the crown 210 so that the melted chocolate flows over each of the tiers 220 and returns to the basin 250. In this way, the chocolate continues to circulate through the fountain 200 and creates levels of chocolate flowing like a waterfall. Certain aspects of the fountain 200 will now be described in further detail.

In one embodiment, food items, such as fruit, are dipped into the chocolate flowing downward from the mounted tiers 220 of the fountain 200. When the food items are removed from the flowing chocolate, and before the chocolate hardens on the food items, drops of chocolate may drip from the food item. If chocolate drips outside of the fountain 200, cleaning the outside surface of the fountain and/or the surface on which the fountain 200 sets may be required. Additionally, chocolate dripped outside of the fountain 200 is, in most circumstances, contaminated and unusable by the fountain 200. Thus, dripping chocolate or beverage is preferably caught by the basin 250 so that it may be recirculated through the fountain 200. In an advantageous embodiment, the diameter of the basin 250 is sufficiently large to capture a significant portion of the dripping chocolate. In one embodiment, the diameter of the basin 250 is greater than or equal to about 400 mm. In another embodiment, the diameter of the basin 250 is greater than or equal to about 475 mm. The diameter of the basin 250 may further be increased to any diameter, such as 500, 600, or 1000 mm, for example.

The basin 250 has a bottom surface 252 and sides 254 which are configured to hold a fluidic material. In one embodiment, the basin 250 is shaped so that the fluidic material flows towards the center of the basin 250 and is available to circulate up the cylinder 230 on the auger 240. In particular, the angle between the bottom surface 252 and the sides 254 is sufficiently large so that the melted chocolate flows towards the bottom surface 252 and the cylinder 230. Accordingly, because of the shape of the basin 250, pooling of melted chocolate on the bottom surface 252 is reduced and substantially all of the melted chocolate circulates through the fountain at a uniform rate. Because substantially all of the chocolate circulates through the fountain 200 at a uniform rate, the chocolate is more uniformly heated as it flows across the bottom surface 252 of the basin 250. In one embodiment, the angle between the bottom surface 252 and the sides 254 is greater than or equal to about 13 degrees. In another embodiment, the angle between the bottom surface 252 and the sides 254 is greater than or equal to about 16. The angle between the bottom surface 252 and the sides 254 may further be increased to 20, 25, 30, or 25 degrees, for example, to maintain the chocolate on the bottom surface 252 of the basin.

As noted above, the heating element 260 is advantageously encased in an aluminum enclosure. Because aluminum has a relatively high thermal conductivity, the aluminum enclosure provides a substantially uniform heating of the bottom surface 252 of the basin 250. In this way, the occurrence of hot spots, or locations that are heated more than others, is greatly reduced and the chocolate, or other fluidic material in the basin 250, is uniformly heated. In one embodiment, the aluminum enclosure is sandwiched between layers of another metal. For example, an aluminum enclosure may be covered, on a top and/or bottom surface, with stainless steel, thus providing a durable, easy to clean, and non-reactive surface for interaction with the chocolate and additionally providing the high thermal conductivity of the aluminum. Additionally, other metals with high thermal conductivity may be used to encase the heating element 260 in order to provide uniform heating of the basin 250. In another embodiment, an aluminum plate, rather than an enclosure, contacts the heating element 260 and the basin 250.

An auger 240 having a spiral flight 242 surrounding a central shaft of the auger 240 is coupled to the bottom surface 252 of the basin 250. A bottom end of the shaft 244 includes a connecting means configured to connect the shaft 244 with the motor 285 so that the motor 285 rotates the auger 240. In the embodiment of FIG. 2, the connecting means comprises a cross-rod 246 that connects with a gear driven by the motor 285. In one embodiment, the diameter of the auger 240, measured from the outer ends of the spiral flight 242, is substantially equal to the inner diameter of the cylinder 230. Thus, the auger 240 fits snuggly within the cylinder 230. As the motor 285 provides a rotational force causing the auger 240 to rotate, melted chocolate, for example, in the basin 250 is moved upwardly along the length of the cylinder 230, traveling upon the top surface of the spiral flight 242.

In an advantageous embodiment, the spiral flight 242 is angled so that the melted chocolate remains on the outer perimeter of the spiral flight 242. Additionally, in one embodiment, the spiral flight 242 has an increased pitch. These features are discussed in more detail below with reference to FIG. 6.

In one embodiment, the crown 210 is a single structure that is formed by metal casting or plastic molding, for example. Because the crown 210 is a single structure that does not require welding to fabricate, there are no welding artifacts, such as burrs or pits, on the crown 210. Accordingly, without the presence of welding artifacts that may accumulate chocolate, the chocolate is easily cleaned from the crown 210 and the crown 210 may be easily sanitized. In one embodiment, while the crown 210 extends over the top 232 of the cylinder 230, the crown 210 is casted so that the melted chocolate remains in an upper portion of the crown 210. As such, the crown 210 may be more easily cleaned than the crowns used in the prior art. These features are discussed in more detail below with reference to FIG. 3.

Exemplary fountain 200 includes three tiers 220 that are each attached to the cylinder 230. A top surface of each of the tiers 220 comes in contact with the melted chocolate that flows off the top circumference 212 of the crown 210 so that the melted chocolate flows over each of the tiers 220 and returns to the basin 250. More particularly, after the melted chocolate flows over the top circumference 212 of the crown 210, the chocolate drops to the top surface of the upper tier 220A. The melted chocolate then flows to an outer perimeter of the upper tier 220A and drops to a lower tier 220B. The melted chocolate next flows to an outside perimeter of lower tier 220B and drops to a base tier 220C. The melted chocolate then flows off of the base tier 220C and returns to the basin 250. The returning melted chocolate flows with the other melted chocolate in the basin 250 and returns to the bottom surface 252 of the basin so that it may again be heated and lifted through the cylinder 230 by the auger 240. In this way, the chocolate continues to circulate through the fountain 200 and creates levels of chocolate flowing like a waterfall.

Figure 3:
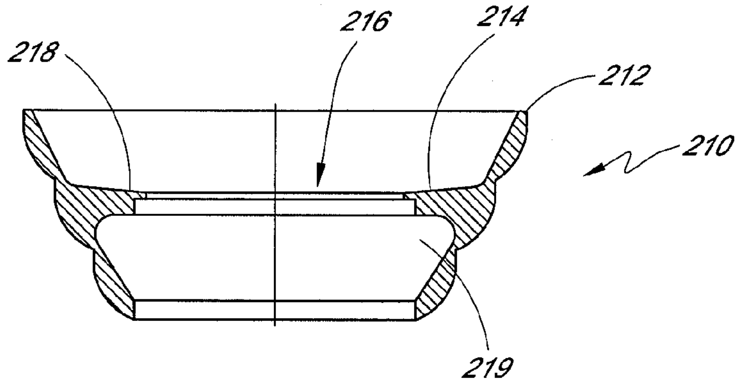
FIG. 3 is a cross-sectional side elevation view of a single structure crown.

FIG. 3 is a cross-sectional side view of the crown 210. The crown 210 includes an aperture 216, through which the cylinder 230 is extended in mounting the crown 210 on the cylinder 230. In one embodiment, the crown 210 is supported on the cylinder 230 by fingers 218 extending inwardly towards a center of the aperture 216. Thus, the fingers 218 of the crown 210 rest upon the top 232 of the cylinder 230. In one embodiment, the fingers 218 are extensions of the bottom surface 214, which covers a lower cavity 219. Because the finger 218 and the bottom surface 214 cover the lower cavity 219, the melted chocolate that flows out of the top 232 of the cylinder 230 onto the bottom surface 214 of the crown 210 does not enter the lower cavity 219. Therefore, cleaning is only required on the bottom surface 214 and sides of the crown 210. Additionally, in one embodiment the crown 210 is investment casted so that there are no weld junctions or burrs that increase the complexity of cleaning melted chocolate from the crown 210.

Figure 4A:
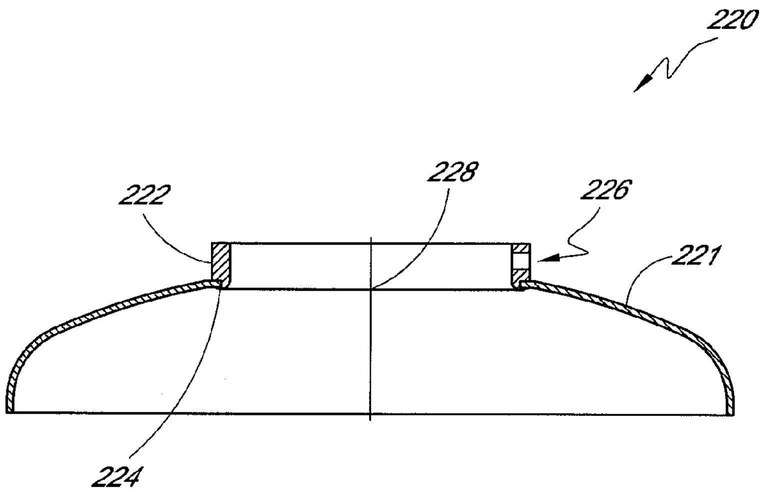
FIG. 4A is a cross-sectional side elevation view of a tier that may be attached to the cylinder to direct the flow of the melting chocolate.

FIG. 4A is a cross-sectional side view of a tier 220 that may be attached to the cylinder 230 to direct the flow of the melting chocolate. In one embodiment, the tier 220 is attached to the cylinder 230 through the use of a connector, inserted and tightened in a cavity 226 that extends through a side of the tier 230. More specifically, the aperture 228 of the tier 220 is first placed around the cylinder 230. The tier 220 is then lowered around the cylinder 230 until the desired position for the tier is reached. In one embodiment, the cavity 226 is threaded so that a bolt, such as a hex bolt, may be tightened through the cavity 226 against the outside of the cylinder 230. In this way the bolt holds the tier 220 in position on the cylinder 230. In one embodiment, the tier 220 includes multiple threaded cavities 226 that may be used to secure the tier 220 to the cylinder. Additionally, other types of attachment devices known in the art may be used to secure the tier 220 to the cylinder 230. In an embodiment using multiple tiers 220, such as that illustrated in FIG. 2, each tier 220 may have a predetermined position on the cylinder 230.

The exemplary tier 220 includes a collar 222 connected to the a body 221. In an advantageous embodiment, rather than welding the collar 222 to the body 221 (which would result in weld joints and burrs which increase the difficulty of cleaning each of the tiers 220) the collar 222 is flanged to the body 221. This process, described further below with respect to FIG. 5, flanges an extrusion of collar 222 forming flange 224 and mounting the collar 222 onto the body 221.

Figure 4B:
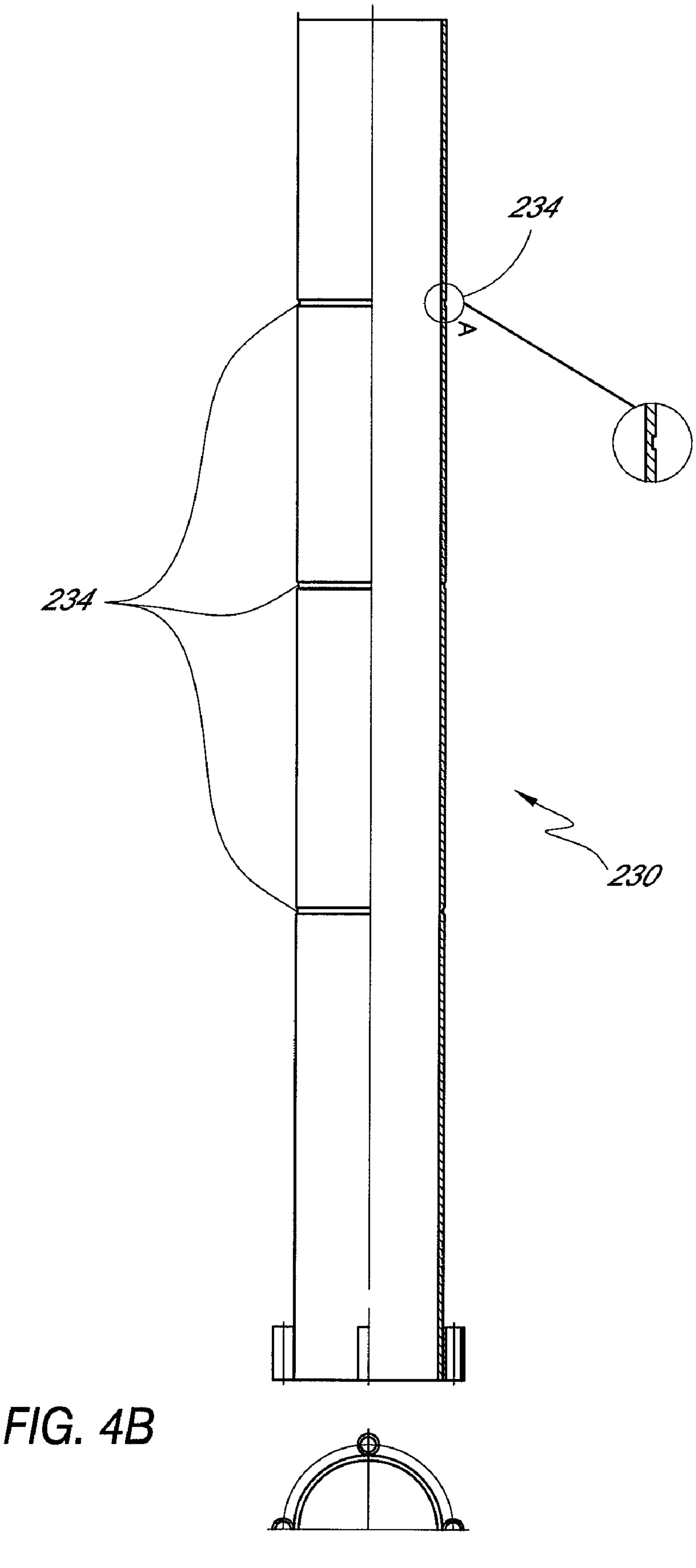
FIG. 4B is a cross-sectional side view of a cylinder including score marks indicating the recommended positions for placing the tiers.

FIG. 4B is a cross-sectional side view of a cylinder 230 including score marks 234 indicating predetermined positions for placing the tiers 220. In one embodiment, each of the score marks 234 extend around the entire perimeter of the cylinder 230. The score marks 234 advantageously allow the user to easily determine the appropriate position for each of the tiers 220. For example, a tier 220 may be lowered until the cavity 226 is aligned with a score mark 234, after which a bolt may be tightened so that the tier 220 is attached around the score mark 234. Also, the score marks 234 on the cylinder 230 advantageously allow the level placement of the tiers 220 without the need of leveling equipment. More particularly, the score marks 234 are placed parallel to the top 232 of the cylinder 230 so that tiers 220 are level when they are aligned with the score marks 234.

In one embodiment, the score marks 234 form a groove of sufficient depth to engage the tier 220 and provide a support for leveling the tier 220 on the cylinder 230. More particularly, the score marks 234 may be of sufficient depth so that as a tier 220 is moved over the score marks 234 the tier 220 engages with the score marks 234. In this way, the predetermined locations for each of the tiers 220 may be easily identified. In one embodiment, the attachment of the tiers 220 in a level orientation, such that the fluidic material flows evenly over the surface of the tiers 220, is also possible because of the interaction of the tiers 220 with the grooves of the score marks 234. For example, in one embodiment the tightening bolts may be tightened so that they extend through the cavity 226 of the tier into the groove of the score mark 234. Thus, attachment of the tiers 220 in a level orientation may be accomplished by simply attaching the tightening bolts so that they contact the score marks 234.

Figure 5:
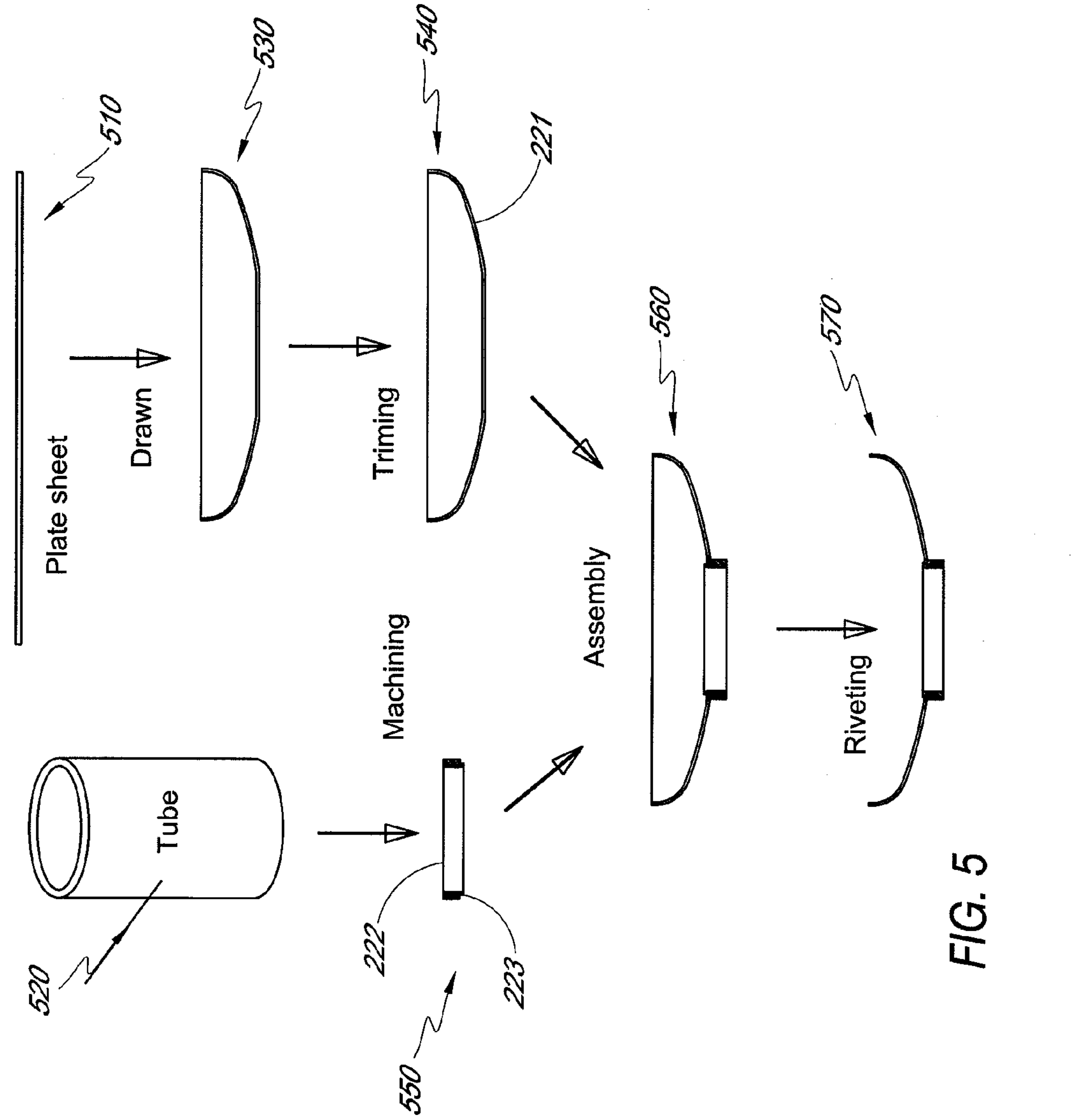
FIG. 5 is a pictoral flow diagram illustrating the assembly of a tier using a flanging, or riveting, process.

FIG. 5 is a pictoral flow diagram illustrating the assembly of a tier 220 using the above-described flanging, or riveting, process. In step 510, a plate sheet of metal is acquired to be formed into the body 221 of a tier 220. Through a drawing process, the plate sheet is shaped into a bowl shaped structure as shown at step 530. The bowl-shaped structure is then trimmed, as shown in step 540, to include an aperture 228, through which the collar 222 may be attached.

In step 520, a tube is provided for manipulation and use as the collar 222. At step 550, the collar 222 is formed by cutting the tube to the appropriate height and machining the tube so that a circular extrusion 223 extends from an inner circumference of the tube. The collar 222 and the body 221 are then assembled in step 560. In an advantageous embodiment, assembly comprises inserting the collar 220 into the aperture of the trimmed plate sheet so that the extrusions extend inside the body 221. In step 570, the extrusions are deformed so that they extend over a portion of the body 221, thus attaching the collar 222 to the body 221 without the use of welding. In one embodiment, the extrusions are pressed so that the junction between the extrusions and the body 221 is substantially smooth. In one embodiment, one or more spot welds may be applied to the junction between the extrusions and the body 221 in order to reinforce the connection between the body 221 and the collar 220. In this embodiment, the spot welds are applied to the side of the body 221 upon which melted chocolate does not flow over. Because the melted chocolate does not flow over the spot welds, the reinforcement of the connection between the body 221 and the collar 220 with spot welds does not increase the complexity of cleaning the fountain 200.

Figure 6:
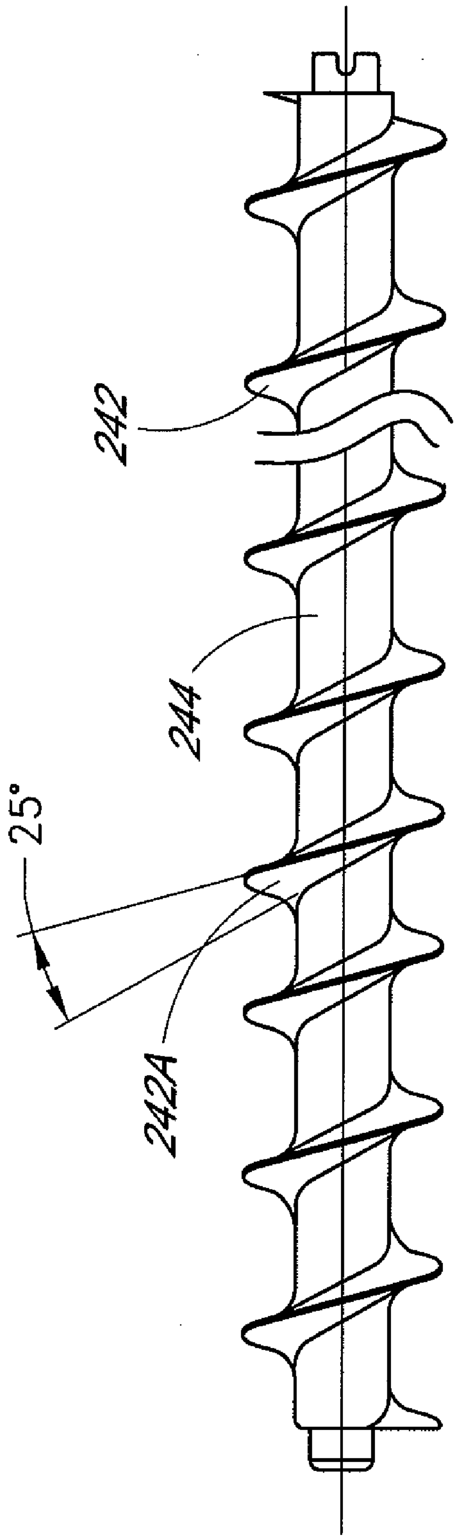
FIG. 6 is a side view of the auger, including a central shaft and a spiral flight.

FIG. 6 is side view of the auger 240, including central shaft 244 and spiral flight 242. As shown in FIG. 6, the incline angle of the spiral flight 242, as shown on revolution 242A, is about 25 degrees. The incline angle of the spiral flight 242 is selected so that the chocolate travels upwardly as the auger 240 rotates. In one embodiment, when the melted chocolate travels upwardly in the cylinder 230 on the surface of the spiral flight 242, the incline angle is such that the chocolate does not contact the shaft 244 of the auger 240. Because the chocolate does not contact the shaft 244, there is less surface area of the auger 240, including the shaft 244 between revolutions of the spiral flight 242, to clean after use of the fountain 200. Additionally, a distance (pitch) between revolutions of the flight 242 is increased so that the increased incline angle is possible.

In one embodiment, the auger 240 is metal, such as stainless steel, for example. In another embodiment, the auger 240 is plastic and is fabricated using a molding process, such as an injection molding process. In one exemplary embodiment, the auger 240 is insert molded. Because the auger 240 is made of plastic fabricated using a molding process, for example, there are no weld spots, pits, burrs on the auger 240. Accordingly, the number of non-smooth areas (that collect melted chocolate) on the auger 240 is reduced and the auger 240 is advantageously more easily cleaned than those in the prior art. Additionally, because the auger 240 is plastic, contact of the rotating auger 240 against the inner surface of the cylinder 230 does not create metal filings and prevents the auger 240 from becoming sharp and harmful to the user. Thus, the auger 240 advantageously reduces contamination caused by contact of the auger 240 with the cylinder 230. In other embodiments, the auger 240 comprises other materials that are easy to clean and/or reduce the occurrence of contaminants that are mixed into the fluidic material due to friction between the auger 240 and the cylinder 230.

Figure 7:
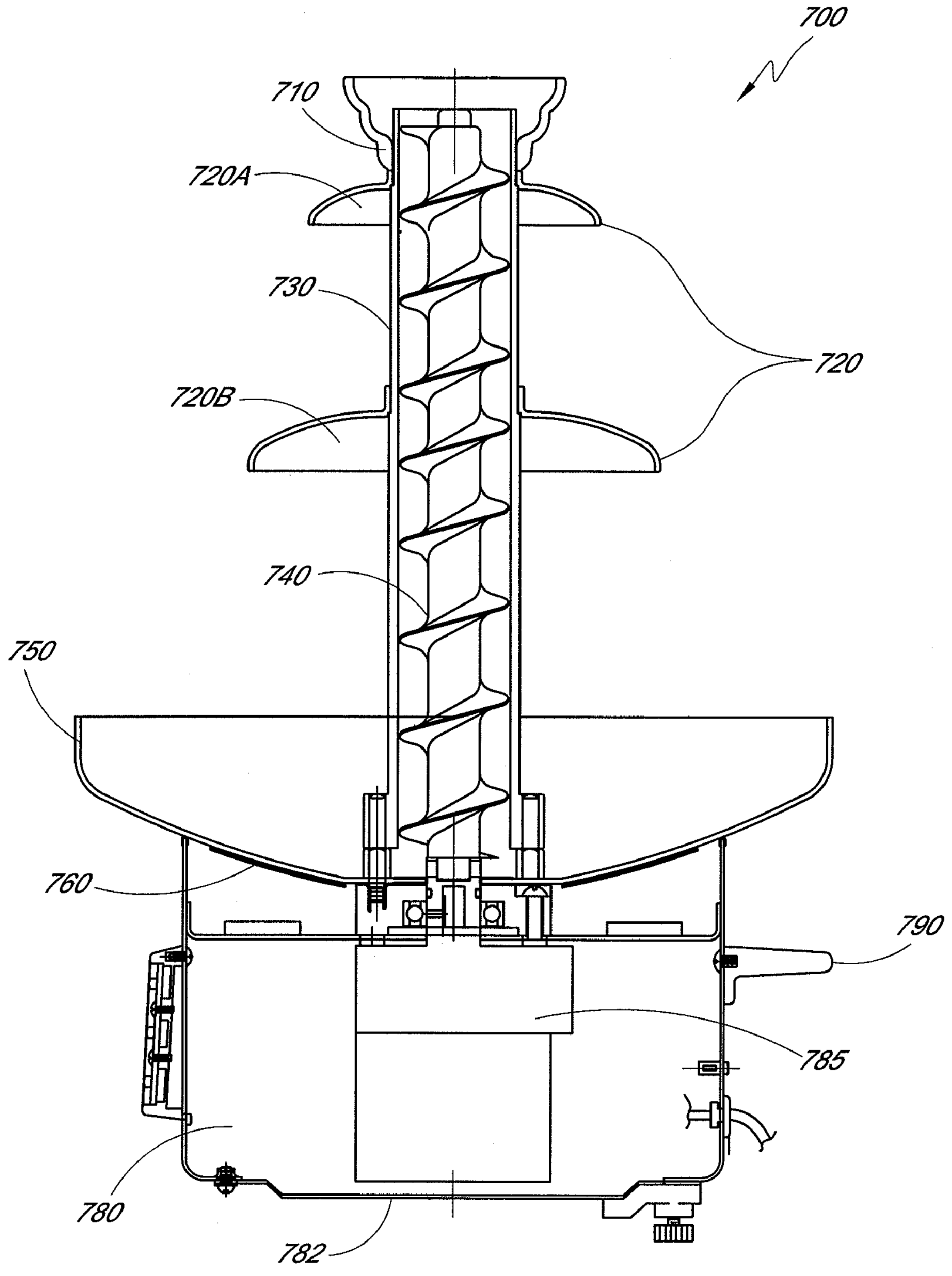
FIG. 7 is a cross-sectional side elevation view of another embodiment of a chocolate fountain.

FIG. 7 is a cross-sectional side view illustrating another embodiment of a chocolate fountain. The chocolate fountain 700 illustrated in FIG. 7 is smaller than the fountain 200 and, accordingly, may be more suitable for home use. The chocolate fountain 700 is advantageously easy to assemble, operate, and clean.

The fountain 700 includes a basin 750 mounted on a housing 780. In one embodiment, the basin comprises a material with a high thermal conductivity, such as aluminum, for example. Additionally, in one embodiment, an aluminum basin may be coated with one or more non-stick materials, such as Teflon. As described further below with reference to FIG. 11, in one embodiment a flexible heater may be attached to the bottom of the basin 750. In this embodiment, because the basin 750 comprises a high thermal conductivity material, a power requirements of the flexible heater may be reduced.

As illustrated in FIG. 7, the housing 780 includes a bottom cover 782. In one embodiment, the bottom cover 782 includes an access panel that may be opened to access the inside of the housing 780. In this way, the components within the housing 780 may be easily accessed and repaired. In another embodiment, other portions of the fountain 700 include access panels that allow the user or technician to easily access and/or repair the components within the housing 780. The fountain 700 also includes one or more handles 790 that allows the user to easily move the entire fountain 700 or a portion of the fountain 700, such as the housing 780 and basin 750.

Similar to the fountain 200 discussed above, the fountain 700 includes a cylinder 730 attached to the basin 750 that houses an auger 740 configured to support a fluidic material as it is lifted upwardly through the cylinder 730. In the embodiment of FIG. 7, a motor 785 is mounted in the housing 780 so that the auger 740 is directly driven by the motor 785. Accordingly, the connection between the motor 785 and the auger 740 does not require additional gears or belts, reducing the number of parts required for the fountain 700.

Figure 8:
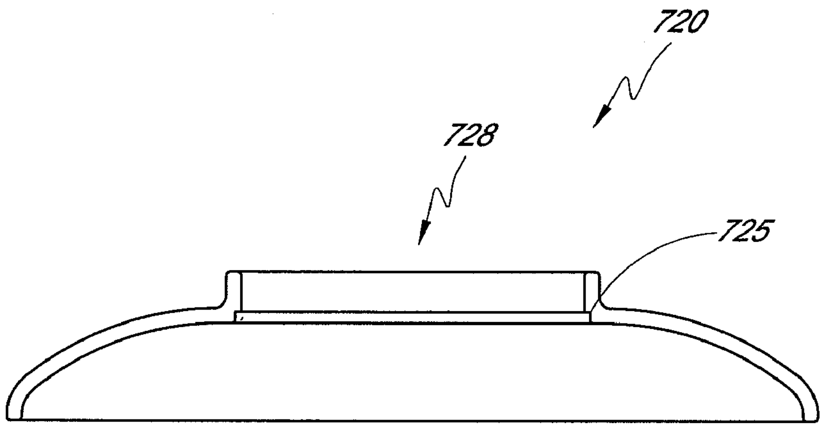
FIG. 8 is a cross sectional side elevation view of an exemplary tier that may be connected to the cylinder.

FIG. 8 is a cross sectional side view of an exemplary tier 720 that may be connected to the cylinder 730. The tiers 720 (including top tier 720A and bottom tier 720B) are mounted on the cylinder 730 and provide a surface on which the fluidic material may flow. For example, in one embodiment, the tiers 720 are metal and are fabricated according to the method described with respect to FIG. 5. Alternatively, as illustrated in FIG. 8, the tiers are a single structure, formed by metal casting, metal drawing, or plastic molding, for example. Accordingly, the tiers 720 do not require welding and, thus, do not have any welding artifacts, such as burrs or pits, that may retain melted chocolate and increase the complexity of cleaning the tiers 720. Also, the tiers 720 may be formed of plastic using a molding process, such as injection molding. While specific methods of manufacturing the tiers 720 are discussed above, it is expressly contemplated that the tiers 720 may be fabricated in any other way known in the art. The fountain 700 includes two tiers 720, namely tiers 720A and 720B. In other embodiment, the fountain 700 may be configured to support any number of tiers, such as 1, 3, 4, 5, or 6 tiers, for example.

As illustrated in FIG. 8, the tier 720 includes an aperture 728, through which the cylinder 730 is mounted. More particularly, the tier 720 is mounted on the cylinder 730 by first placing the tier 720 on the upper end 732 of the cylinder 730. The tier 720 is placed on the cylinder 730 so that the cylinder 730 extends through the aperture 728 of the tier 720. The tier 720 is then moved down the length of the tier 720 until the desired location for the tier 720 is reached. In one embodiment, each of the tiers 720, such as tiers 720A and 720B, have different diameters. For example, the chocolate fountain 700 (FIG. 7) illustrates the tier 720A having a smaller diameter than tier 720B. Additionally, the apertures 728 of tiers 720 may have different diameters. As discussed in detail below (FIG. 9), because the tiers 720 have apertures 728 of different diameters, the location of the tiers 720 on the cylinder 730 may be easily determined by simply sliding each tier 720 down the cylinder 730 until the tier 720 locks in to a predetermined location on the cylinder 730.

In one embodiment, the tier 720 includes a notch 725 on the inner surface of the tier 720. The notch 725 is configured to engage the cylinder 730 so that the tier 720 is supported on the cylinder 730 without the need for an additional tightening mechanism. In one embodiment, the notch 725 is molded as part of the tier 720. In another embodiment, the notch 725 is etched into the tier 720 after molding the tier 720.

Figure 9:
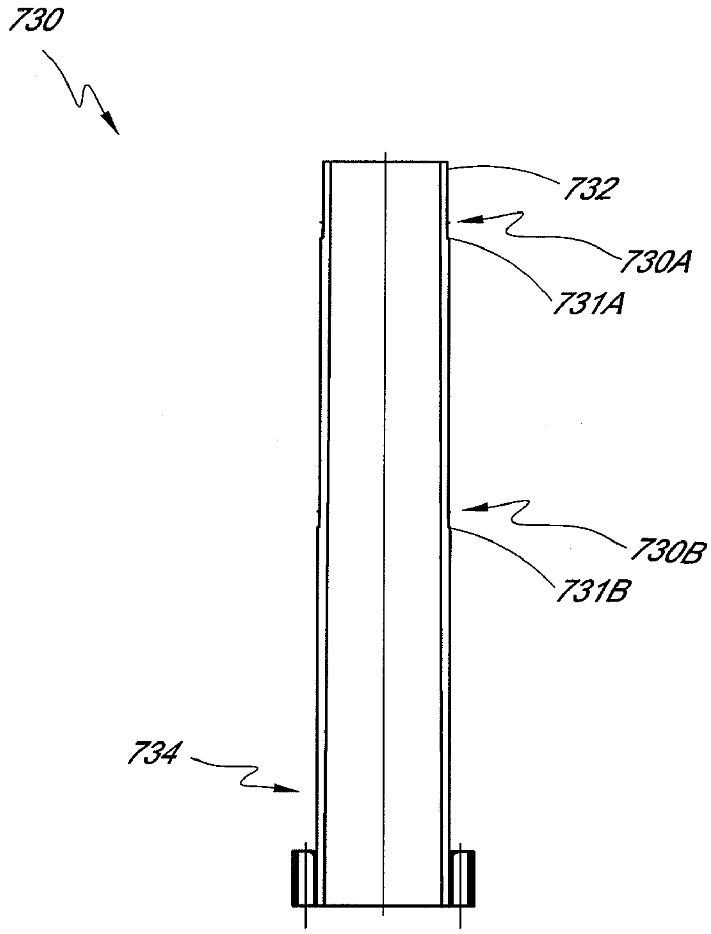
FIG. 9 is a cross-sectional side elevation view of a cylinder used to support the tiers.

FIG. 9 is a cross-sectional side view of a cylinder used to support the tiers 720. In one embodiment, the cylinder 730 is tapered so that a diameter of the upper end 732 of the cylinder 730 is smaller than a diameter of the lower end 734 of the cylinder 730. Because the cylinder 730 is tapered, tiers 720 having apertures 728 with different diameters will each fittingly engage the cylinder 730 at different positions of the cylinder 730. For example, in one embodiment, the bottom tier 720B has an aperture with a diameter that is substantially equal to a diameter of the cylinder 730 at position 730B. Accordingly, the tier 720B engages with the cylinder at position 730B so that the tier 720B is manually mounted on the cylinder 730. Similarly, the top tier 720A has an aperture with a diameter that is substantially equal to a diameter of the cylinder 730 at position 730A. Thus, the tier 720A engages with the cylinder at position 730A so that the tier 720A is manually mounted on the cylinder 730. In this way, the tiers 720 may be manually mounted on the cylinder 730.

In another embodiment, the cylinder 730 includes one or more ledges 731 configured to engage with tiers 720 in mounting the tiers 720 on the cylinder 730. In one embodiment discussed above, the tier 720 includes a notch 725 which is configured to engage with the ledge 731 in mounting the tier 720 on the cylinder 730. With reference to the cylinder 730 (FIG. 9), the ledge 731A has a larger diameter than ledge 731B. Accordingly, a tier 720 having an aperture with a diameter larger than the diameter of ledge 731A may be mounted at a lower location 730A, such as location 730B, on the cylinder 730.

Figure 10:
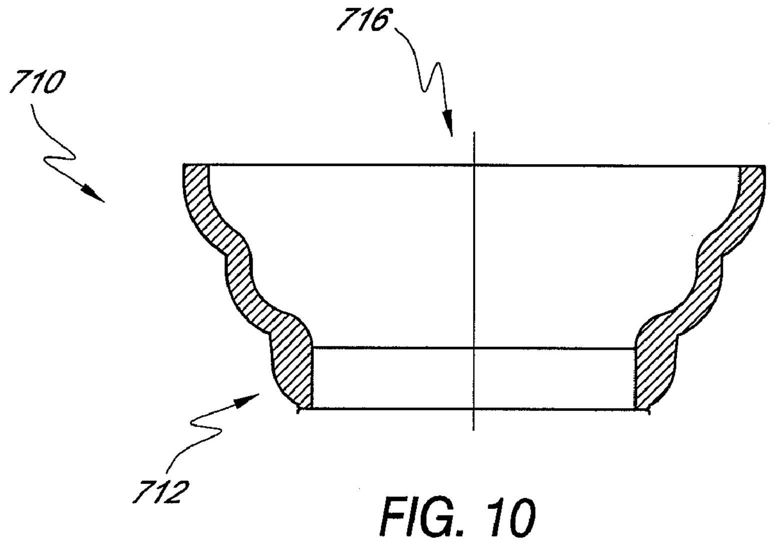
FIG. 10 is a cross-sectional side view of a crown configured for placement on the top of the cylinder.

FIG. 10 is a cross-sectional side view of a single structure crown 710 configured for placement on the top of the cylinder 730. The crown 710 includes an aperture 716 configured to fit over the upper end 732 of the cylinder 730. In one embodiment, the crown 710 is supported on the cylinder 730 by a tier 720, such as tier 720A (FIG. 7). As discussed above, the tiers 720, such as tier 720A, for example, may be mounted on the cylinder 730 using various mounting mechanisms. After the tier 720A, for example, is mounted on the cylinder 730, the tier 720A is stabilized and may support a further structure. Accordingly, the crown 710 may be positioned on the cylinder 730, with the aperture 716 surrounding the cylinder, so that a lower surface 712 of the crown 710 is supported by the tier 720A. In this way, the number of required parts needed to mount the crown 710 is reduced.

Figure 11:
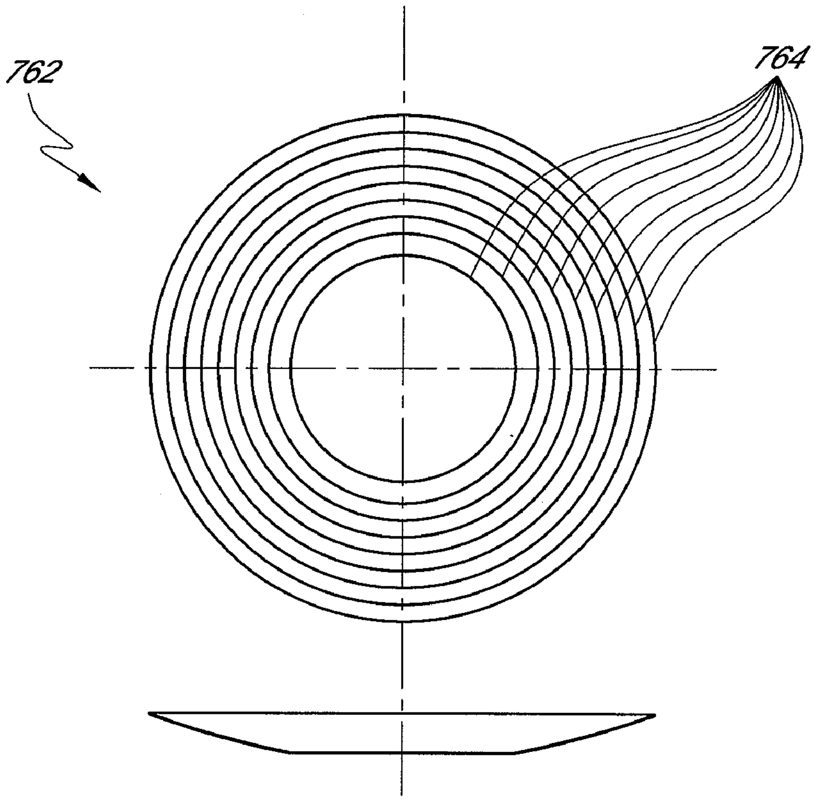
FIG. 11 is a top plan view of a flexible heater comprising a plurality of heating members.

FIG. 11 is a top view of a flexible heater 760 comprising at least one heating member 764. In one embodiment, the flexible heater 760 comprises multiple heating members 764. In the embodiment of FIG. 11, multiple heating members 764 are concentric, that is, each of the heating members 764 has a common center. In another embodiment, multiple heating members 764 are arranged in other configurations, such as in a web or a grid pattern, for example. In an advantageous embodiment, the flexible heater 760 is encapsulated in flexible heat conductive medium, such as rubber. For example, a filled rubber, such as a carbon filled rubber, may be used to encapsulate the flexible heater 750. Thus, the flexible heater 750 advantageously may be attached directly to a non-planar surface and provide substantially uniform heating of the surface. In an advantageous embodiment, each of the heating members 764 provides a heat source capable of transferring heat. The flexible heater is advantageously attached to the bottom of the basin 750 and provides substantially uniform heating of the basin 750. In this way, the occurrence of hot spots, or locations that are heated more than others, is greatly reduced and the chocolate, or other fluidic material in the basin 750, is uniformly heated.

Figure 12:
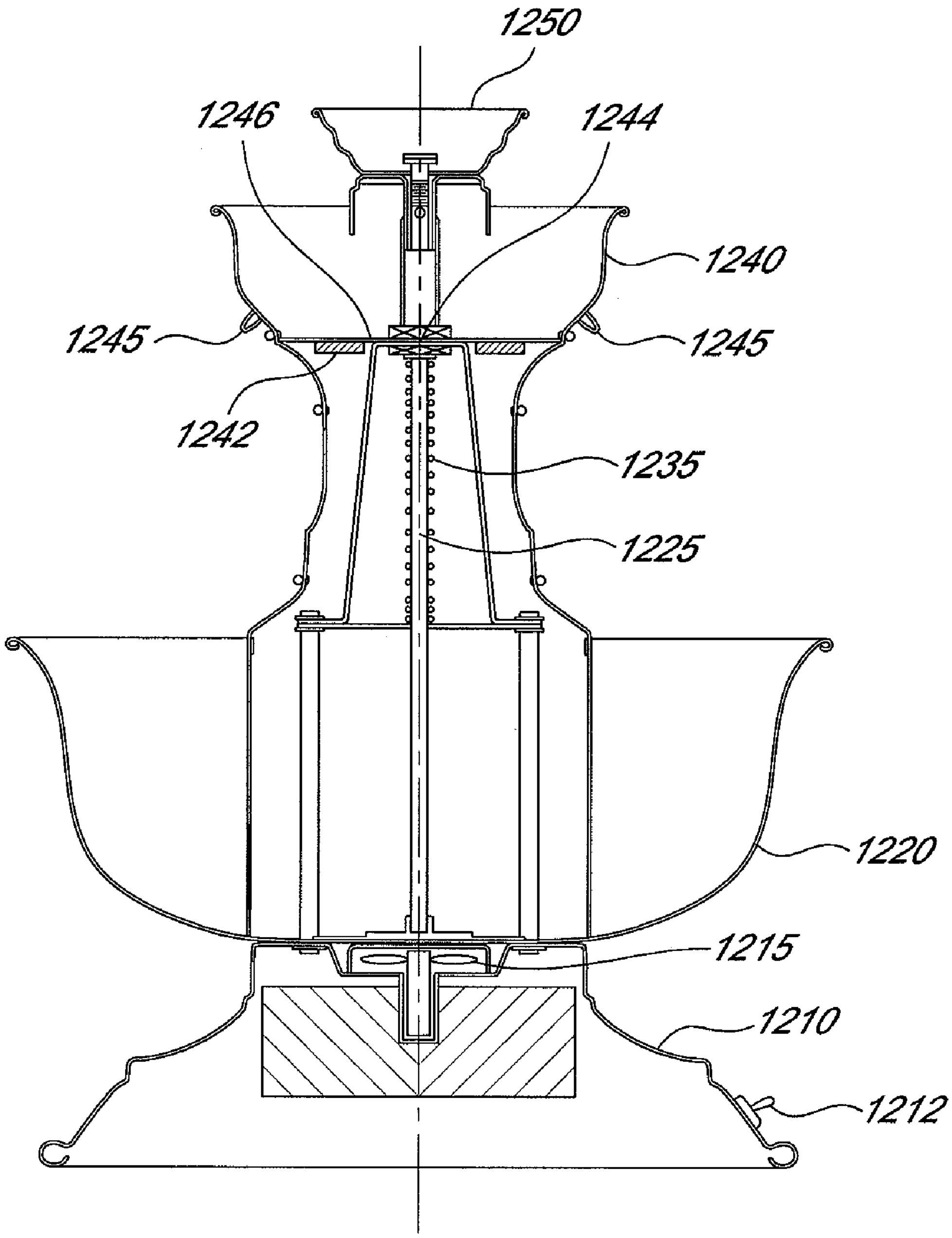
FIG. 12 is a cross-sectional side view of a fountain that is configured for heating and/or cooling a beverage that is circulated through the fountain.

FIG. 12 is a cross-sectional side view of a fountain 1200 that is configured for heating and/or cooling a beverage that is circulated through the fountain. In one embodiment, the fountain 1200 includes one or more heating elements that heat the beverage, such as tea, coffee, or chocolate milk, for example, that circulates through the fountain. In another embodiment, the fountain 1200 includes one or more cooling elements that cool the beverage, such as fruit drinks and juices, for example, that circulates through the fountain. In yet another embodiment, the fountain 1200 may include both heating and cooling elements that may be alternatively activated so that the fountain 1200 may be used to heat beverages and cool beverages. In this embodiment, the fountain 1200 advantageously includes a switch 1212, or other mechanism, that may be adjusted by a user in order to select either the heating or the cooling mode. The exemplary beverage fountains described herein may include any number of heating and/or cooling elements, which may be located at various positions on the fountains in order to change the temperature of the beverage within the fountain.

The exemplary fountain 1200 comprises a support 1210 that is configured to support the other components of the fountain 1200 and which engages with a surface, such as a table or countertop. In one embodiment, a heating element may also be housed within the support 1210. In the exemplary embodiment of FIG. 12, a basin 1220 is supported by the support 1210. In one embodiment, the basin is mounted on the support 1210 so that the basin 1220 is stable on the support 1210 during operation of the fountain 1200. In one embodiment, the basin 1220 is removably attachable to the support

1210, such that the basin 1210 may be separated from the support 1210 for cleaning or storage, for example.

In the embodiment of FIG. 12, an impeller 1215 is positioned in a lower portion of the basin 1220. The impeller 1215 transfers energy from a motor that drives the impeller to the beverage within the basin 1220 by forcing the beverage outwards from the center of rotation of the impeller 1215. Thus, the impeller 1215 pushes the beverage in the basin 1220 upward, substantially perpendicular to a bottom surface of the basin 1220. A cylinder 1225, such as a tube, extends upward from a location proximate to the bottom surface of the basin 1220. Thus, at least some of the beverage that is forced upward by the impeller 1215 enters the cylinder 1225 and moves upward within the cylinder 1225. In other embodiments, the impeller 1215 may be replaced by another source of movement, such as a pump.

The exemplary fountain 1200 includes a reservoir 1240 that is located proximate to a top end of the cylinder 1225. The reservoir 1240 is configured to contain a portion of the beverage that is received through an opening at the top of the cylinder 1225. In the embodiment of FIG. 12, the reservoir 1240 comprises apertures 1245 that are configured to allow the beverage in the reservoir 1240 to pass through and return to the basin. In one embodiment, the apertures 1245 are configured such that the beverage leaving the reservoir 1240 flows like a waterfall as it returns to the basin 1220. The number of apertures 1245 on a beverage fountain may be varied, so that various fountains have 1, 2, 4, 8, 10, or 12 apertures, for example. In one embodiment, beverage containers, such as cups or glasses, are placed under the apertures in order to fill the containers with beverage that passes through the apertures 1245.

In the embodiment of FIG. 12, a heating element 1242 is positioned on a lower surface of the reservoir 1240. The heating element 1242 may be any type of heating device known in the art, such as a resistive electrical heat generation device. In the embodiment of FIG. 12, the heating element 1242 is substantially circular and extends around a central aperture 1244 of the reservoir 1240. When the heating element 1242 is activated, such as by moving a switch 1212 to an on position, the heating element 1242 produces heat, which is transferred to a bottom surface 1246 of the reservoir 1240 and to the beverage that is contained within the reservoir 1240. Thus, the heating element 1242 heats the beverage before the beverage passes through the apertures 1245.

The exemplary fountain 1200 additionally comprises a heating coil 1235 that is wrapped around the cylinder 1230 and extends in a spiral configuration around at least a portion of the cylinder 1230. In this embodiment, the heating coil 1235 transfers heat to the cylinder 1230, which in turn heats the beverage that is moving within the cylinder 1230. In one embodiment, the heating coil 1235 is activated by the same switch 1212 that activates the heating element 1242. When both the heating coil 1235 and heating element 1242 are activated, the beverage that is circulating through the fountain may be heated quicker and to a higher temperature than if only one of the heating mechanisms is used.

In one embodiment, an additional heating element (not shown) may be coupled to the basin 1220 and configured to heat portions of the basin 1220 in order to heat the beverage within the basin 1220. Thus, the beverage contained in the basin 1220 may also be heated. In other embodiments, heating elements of any type may be located at other locations on the fountain 1200 that contact the beverage. Accordingly, the number of heating elements in a beverage fountain may vary, such as from 1-10 or more heating elements, for example.

In one embodiment, the heating element 1242 and the heating coil 1235 are replaced with a cooling element and a cooling coil, respectively. In this embodiment, the beverage in the reservoir 1240 is cooled when the cooling element is activated and the beverage in the cylinder is cooled when the cooling coil is activated. Additionally, a cooling element may be coupled to the basin so that beverage in the basin 1220 is cooled. Thus, the beverage fountain 1200 may be either configured as a fountain that heats beverages or a fountain that cools beverages. In one embodiment, each of the cooling elements is activated by a single switch 1212 on the beverage fountain. In yet another embodiment, the fountain 1200 may include both heating and cooling elements that are alternatively activated in order to heat or cool the beverage, respectively. In this embodiment, one or more switches may be used to select either a heating or cooling mode for the fountain.

In the embodiment of FIG. 12, the fountain 1200 also includes a container 1250 that is mounted atop the reservoir 1240. The container 1250 may be configured to hold decorative items, such as flowers.

Figure 13:
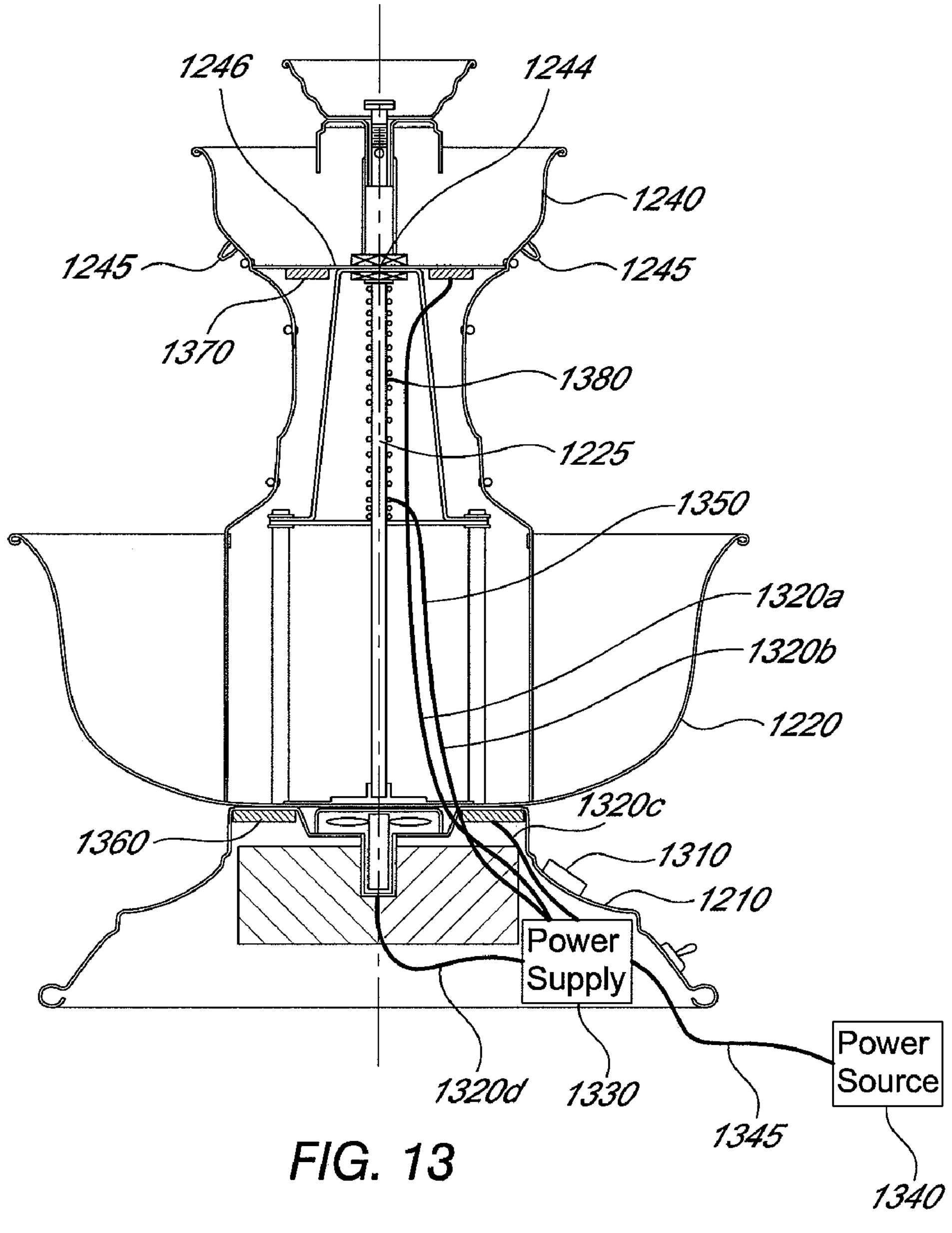
FIG. 13 is a cross-sectional side view of another fountain that is configured for heating and/or cooling a beverage that is circulated through the fountain.

FIG. 13 is a cross-sectional side view of a fountain 1300 that is configured for heating and/or cooling a beverage that is circulated through the fountain 1300. As those of skill in the art will recognize, in order to power many electronic devices, such as the fountain 1300, for example, those devices typically include a power supply configured for coupling with an external power source. As illustrated in FIG. 13, the fountain 1300 comprises a power supply 1330 that is electrically coupled to a power supply 1340 via an electrical connection 1345. The external power source 1340 may include a wall outlet connected to a municipal power grid, or any other suitable power source. In the exemplary fountain 1300, the power supply 1330 is illustrated inside the support 1210; however, in other embodiments, the power supply may be external to the support 1210, such as inline with the electrical connection 1345. In one embodiment, the power supply 1330 conditions and regulates power received from the power source 1340, so that an output from the power supply 1330 is suitable for powering the temperature adjusting elements.

Exemplary FIG. 13 also illustrates electrical connections 1320 coupling the temperature adjusting elements to a power supply 1330. In the embodiment of FIG. 13, the temperature adjusting elements include temperature adjusting elements 1360, 1370, and 1380. In one embodiment, each of the temperature adjusting elements 1360, 1370, 1380 includes components that are capable of both heating and cooling. For example, the temperature adjusting element 1380 may include two coils, namely, a heating coil and a cooling coil. In another embodiment, some of the temperature adjusting elements 1360, 1370, 1380 include only heating elements, while the remaining temperature adjusting elements 1360, 1370, 1380 include cooling elements. Any combination of heating and cooling elements within each of the temperature adjusting elements 1360, 1370, and 1380 is contemplated. In addition, additional temperature adjusting elements may be located at other locations of the fountain 1300.

In the exemplary fountain 1300, the electrical connections 1320A and 1320B from the temperature adjusting element 1370 and 1380, respectively, extend through an inner cavity 1350 of the fountain 1330. In other embodiments, the electrical connections 1320A, 1320B may be located elsewhere. Electrical connection 1320C is also shown connecting the temperature adjusting element 1360 to the power supply.

Exemplary fountain 1330 also comprises a thermostat 1310 configured to sense a temperature of the circulating beverage and control operation of the temperature adjusting elements in order to change the beverage temperature towards a desired set temperature. In one embodiment, the thermostat includes a finite number of modes, such as "warm", "warmer", and "hot", and/or "cold", "colder", and "near freezing," for example, or simply "off", "heat", and "cool" modes. In other embodiments, the thermostat includes an analog adjustment that allows the user to select a temperature for the beverage within a temperature range that the fountain 1300 is capable of achieving. For example, in one embodiment the thermostat may be adjusted between temperatures of 40-100 degrees Fahrenheit. Thus, depending on the current beverage temperature, the temperature selected on the thermostat may cause the thermostat to activate one or more of the temperature adjusting elements in a heating mode or in a cooling mode. For example, if the current beverage temperature is 60 degrees and the thermostat 1310 is set for 50 degrees, the thermostat 1310 advantageously activates one or more of the temperature adjusting elements in a cooling mode. As discussed further below, the temperature adjusting elements may comprising heating elements, cooling elements, or a combination of heating and cooling elements. Thus, in order to cool a beverage, the cooling elements may be activated and/or the heating and cooling elements may be activated in a cooling mode. Likewise, in order to heat a beverage, the heating elements may be activated and/or the heating and cooling elements are activated in a heating mode.

In one embodiment, the electrical connections 1320A, 1320B, and 1320C are coupled to the thermostat 1310, and the thermostat 1310 is coupled to the power supply 1330. In this embodiment, the thermostat is configured to pass power from the power supply 1330 to one or more of the temperature adjusting elements in order to activate the one or more temperature adjusting elements and modify the temperature of the beverage. For example, if the thermostat 1310 determines that the temperature of the beverage should be increased, the thermostat 1310 may provide power to one or more of the temperature adjusting elements. In one embodiment, the thermostat also includes a control module, such as an ASIC, FPGA, or microprocessor, that controls power delivery to the temperature adjusting elements 1360, 1370, 1380. In one embodiment, the control module also controls whether the temperature adjusting elements 1360, 1370, 1380 should operate in a heating mode or in a cooling mode. In other embodiments, the fountain 1300 may include a switch that indicates a heating mode or a cooling mode.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A beverage fountain comprising:

a basin configured to contain a beverage;

a source of fluid movement comprising an impeller located proximate to the basin;

a longitudinal cylinder extending substantially perpendicular from a location proximate to a bottom surface of the basin and configured to contain the beverage, wherein the source of fluid movement is positioned in only a lower portion of the cylinder and is configured to urge portions of the beverage contained in the basin upward and away from the source of fluid movement in the cylinder;

a reservoir positioned proximate a top end of the cylinder, the reservoir comprising one or more apertures through which the beverage passes in order to return to the basin, wherein the beverage circulates from the basin, through the longitudinal cylinder, through the one or more apertures in the reservoir, and returns to the basin; and one or more heating elements configured to heat the beverage.

2. The beverage fountain of claim 1, wherein the one or more heating elements comprises a coil that is positioned around at least a portion of the longitudinal cylinder, the coil transferring heat to the longitudinal cylinder so that the beverage within the longitudinal cylinder is heated.

3. The beverage fountain of claim 1, wherein the one or more heating elements comprises a heating element located proximate to the basin and configured to transfer heat to at least a portion of the basin in order to heat portions of the beverage in the basin.

4. The beverage fountain of claim 1, wherein the one or more heating elements comprises a heating element located proximate to the reservoir and configured to transfer heat to at least a portion of the reservoir in order to heat portion of the beverage in the reservoir.

5. The beverage fountain of claim 1, wherein the cylinder comprises a heat conductive material.

6. The beverage fountain of claim 1, further comprising an electrical switch coupled to each of the one or more heating elements, wherein when the switch is in a first position an electrical current is passed to the one or more heating elements and in a second position substantially no electrical current is passed to the one or more heating elements.

7. A fountain for circulating a fluidic beverage material, the fountain comprising:

a basin configured to contain the fluidic beverage material;

a source of fluid movement comprising an impeller located proximate to the basin and configured to exert a force against the fluidic beverage material;

a cylinder having an end located proximate to the basin and extending substantially perpendicular from a location proximate to a bottom surface of the basin, the cylinder fluidly coupled to the source of movement and configured to contain the fluidic beverage material as the fluidic beverage material is forced through the cylinder due to the force exerted by the source of fluid movement;

a reservoir positioned proximate a top end of the cylinder, the reservoir comprising one or more apertures through which the fluidic beverage material passes in order to return to the basin, wherein the fluidic beverage material circulates from the basin, through the cylinder, through the one or more apertures in the reservoir, and returns to the basin; and;

one or more temperature adjusting devices coupled to at least one of the basin and the cylinder, the temperature adjusting devices comprising heating elements configured to adjust a temperature of the fluidic beverage material.

8. The fountain of claim 7, where the temperature adjusting devices increase the temperature of the fluidic beverage material to more than about 90 degrees Fahrenheit.

9. The fountain of claim 7, wherein the temperature adjusting devices comprise cooling elements configured to decrease the temperature of the fluidic beverage material.

10. The fountain of claim 7, where the temperature adjusting devices decreases the temperature of the fluidic beverage material to less than about 50 degrees Fahrenheit.

11. The fountain of claim 7, wherein the temperature adjusting devices include a coil that extends around a perimeter of the cylinder and contacts the cylinder so that a temperature of the fluidic beverage material within the cylinder is affected by the coil.

12. The fountain of claim 7, wherein the temperature adjusting devices include a temperature adjusting element positioned to contact the basin so that a temperature of the fluidic beverage material contained in the basin is affected by the temperature adjusting element.

13. The fountain of claim 7, wherein the temperature adjusting devices include a temperature adjusting element positioned to contact the reservoir so that a temperature of the fluidic beverage material contained in the reservoir is affected by the temperature adjusting element.

14. The fountain of claim 7, further comprising an electrical switch configured to control operation of the one or more temperature adjusting devices.

15. The fountain of claim 7, further comprising an adjustable thermostat configured to control operation of the one or more temperature adjusting devices in order to maintain a temperature of the fluidic beverage material at a desired temperature.

16. A fountain for circulating a fluidic beverage material, the fountain comprising:

a basin for containing the fluidic beverage material;

a source of fluid movement located proximate to the basin and configured to exert a force against the fluidic beverage material;

a cylinder having an end located proximate to the basin and extending substantially perpendicular from a location proximate to a bottom surface of the basin, the cylinder fluidly coupled to the source of movement and configured to contain the fluidic beverage material as the fluidic material beverage is forced through the cylinder due to the force exerted by the source of fluid movement; and means for adjusting a temperature of the fluidic beverage material positioned proximate to the end of the cylinder opposite the basin, wherein the temperature adjusting means comprises one or more heating elements.

17. The fountain of claim 16, wherein the temperature adjusting means comprises one or more cooling elements and one or more heating elements.

18. A method of operating a beverage fountain, the method comprising:

providing a basin for containing the beverage;

positioning a source of fluid movement comprising an impeller proximate to the basin, the source of fluid movement being configured to exert a force against the beverage;

coupling a cylinder to the basin so that an end of the cylinder is located proximate to the basin, the cylinder extending substantially perpendicular from a bottom surface of the basin, wherein the cylinder is configured to contain the beverage as the beverage is forced upward through the cylinder due to the force exerted by the source of fluid movement; and adjusting a temperature of the beverage as the beverage is forced upward through the cylinder.

19. The method of claim 18, wherein adjusting the temperature of the beverage comprises heating the beverage.

20. The method of claim 18, wherein adjusting the temperature of the beverage comprises cooling the beverage.

21. The method of claim 18, wherein adjusting the temperature of the beverage comprises cooling the beverage when the fountain is in a first operational mode and heating the beverage when the fountain is in a second operational mode.

22. The method of claim 21, wherein the operational mode is determined based on the location of a switch that is coupled to the fountain.

23. The method of claim 21, wherein the operational mode is determined based on a position of a thermostat that is coupled to the fountain.

* * * * *

UNITED STATES PATENT AND TRADEMARK OFFICE

CERTIFICATE OF CORRECTION

PATENT NO. : 7,743,698 B2
APPLICATION NO. : 11/418825
DATED : June 29, 2010
INVENTOR(S) : Richard B. Muir et al.

It is certified that error appears in the above-identified patent and that said Letters Patent is hereby corrected as shown below:

Column 2, Lines 66-67, after “performance” please insert therefore, --.--.

Column 3, Line 9, please delete “pictoral” and insert therefore, --pictorial--.

Column 6, Line 53, please delete “the”.

Column 7, Line 25, please delete “pictoral” and insert therefore, --pictorial--.

Column 13, Line 19, please delete “comprising” and insert therefore, --comprise--.

In Claim 1, Column 13, Line 63, please delete “longitudinal cylinder” and insert therefore, --tube--.

In Claim 1, Column 13, Lines 66-67, and Column 14, Line 1, please delete “in only a lower portion of the cylinder and is configured to urge,” and insert therefore, --proximate a lower end of the tube and configured to exert a force on--.

In Claim 1, Column 14, Line 1, after “basin” please add --such that the portions of the beverage are moved within the tube--.

In Claim 1, Column 14, Line 2, after “movement” please delete therefore, “in the cylinder”.

In Claim 1, Column 14, Line 4, please delete “cylinder” and insert therefore, --tube--.

In Claim 1, Column 14, Line 8, please delete “longitudinal cylinder” and insert therefore, --tube--.

In Claim 2, Column 14, Line 14, please delete “cylinder” and insert therefore, --tube--.

Signed and Sealed this
Twelfth Day of April, 2011

David J. Kappos

David J. Kappos
*Director of the United States Patent and Trademark Office*

In Claim 2, Column 14, Line 15, please delete “cylinder” and insert therefore, --tube--.

In Claim 2, Column 14, Line 16, please delete “cylinder” and insert therefore, --tube--.

In Claim 5, Column 14, Line 27, please delete “cylinder” and insert therefore, --tube--.

In Claim 7, Column 14, Line 41, please delete “cylinder” and insert therefore, --tube--.

In Claim 7, Column 14, Line 43, please delete “cylinder” and insert therefore, --tube--.

In Claim 7, Column 14, Line 46, please delete “cylinder” and insert therefore, --tube--.

In Claim 8, Column 14, Line 62, please delete “where” and insert therefore, --wherein--.

In Claim 10, Column 15, Line 1, please delete “where” and insert therefore, --wherein--.

In Claim 11, Column 15, Line 6, after the words “of the” please delete “cylinder” and insert therefore, --tube--.

In Claim 11, Column 15, Line 6, after the words “contacts the” please delete “cylinder” and insert therefore, --tube--.

In Claim 11, Column 15, Line 7, please delete “cylinder” and insert therefore, --tube--.

In Claim 16, Column 15, Line 33, please delete “cylinder” and insert therefore, --tube--.

In Claim 16, Column 15, Line 35, please delete “cylinder” and insert therefore, --tube--.

In Claim 16, Column 15, Lines 37-38, please delete “fluidic material beverage” and insert therefore, --fluidic beverage material--.

In Claim 16, Column 15, Line 38, please delete “cylinder” and insert therefore, --tube--.